United States Patent [19]

Hipko

[11] Patent Number: 4,540,880
[45] Date of Patent: Sep. 10, 1985

[54] UNIVERSAL PRODUCT CODE SCANNABLE COUPON

[75] Inventor: George P. Hipko, Milltown, N.J.

[73] Assignee: Beatrice Foods, Co., Chicago, Ill.

[21] Appl. No.: 512,658

[22] Filed: Jul. 11, 1983

[51] Int. Cl.³ .............................................. G06K 19/00
[52] U.S. Cl. ..................................... 235/487; 235/493
[58] Field of Search .................. 235/487, 493; 283/56, 283/81, 85

[56] References Cited

U.S. PATENT DOCUMENTS 3,715,570  2/1973  Weichselbaum ..................... 235/493

Primary Examiner—Harold I. Pitts
Attorney, Agent, or Firm—Shlesinger, Arkwright, Garvey & Fado

[57] ABSTRACT

A consumer attachable pre-oriented scannable coupon for use in combination with an article and an optical scanner system, comprising a generally planar member having a front and rear surface; said member including a stub portion and a dealer redemption return portion; force responsive separation means disposed between said stub portion and said dealer redemption return portion; said stub portion rear surface having adhesive means generally adjacent to the separation means for securing said stub portion to said article and for permitting ease in separation of said dealer redemption return portion from said stub portion once said stub portion is secured to an article; said stub portion front surface having optically scannable indicia means thereon for being scanned by said scanner system for transmitting data thereto; said stub portion front surface having premium information printed thereon spaced from an optically scannable indicia means; said dealer redemption return portion of front surface having printed information thereon; and, said dealer redemption return portion being separatable from said stub portion generally subsequent to said optically scannable indicia means being scanned by said scanner system and whereby said adhesive means secures said stub portion to said article while sufficient force is applied to said dealer redemption return portion for causing separation of said dealer redemption return portion from said stub portion as disclosed.

12 Claims, 5 Drawing Figures

U.S. Patent  Sep. 10, 1985  4,540,880
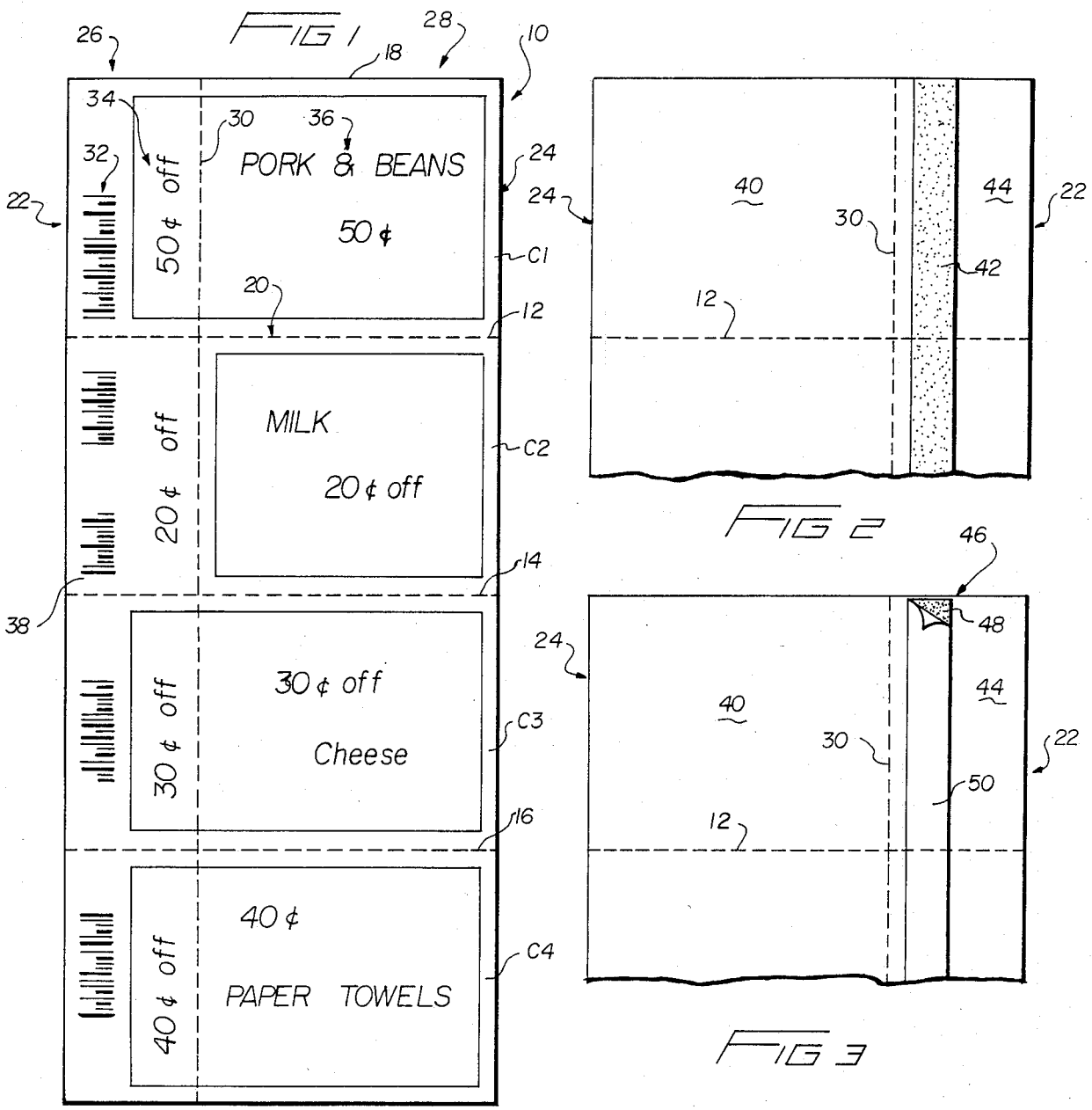
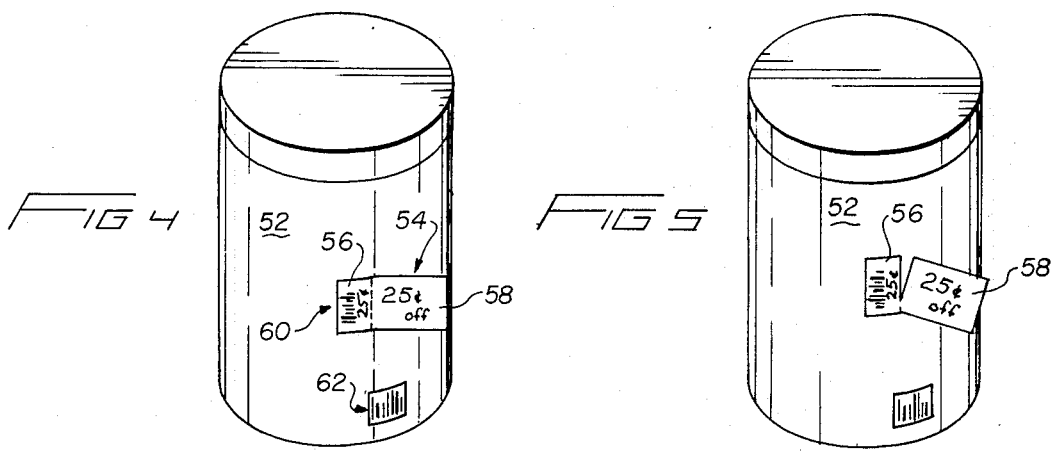

1

UNIVERSAL PRODUCT CODE SCANNABLE COUPON

BACKGROUND OF THE INVENTION

The use of optical scanning systems in grocery stores, as well as other retail establishments, has increased greatly in the recent past. The use of these scanners has improved the efficiency and overall reliability of the checkout and payment operations of grocery stores. The Universal Product Code (UPC) scannable indicia printed onto the label of the articles to be purchased has permitted an optical scanner to be interconnected with a host computer so to keep track of the products and articles purchased, as well as to record and total the price.

Many manufacturers find it desirable to promote the sale of their products by distributing premium coupons to the interested public. The distributed premium coupons have heretofore been separate from the related products and it has been necessary for the checkout personnel to review the purchased articles to ascertain that the products for which the premiums are to be paid have, in fact, been purchased. This review is necessary because premium coupons normally have a dealer redemption return portion which must be returned to the manufacturer in order that the grocery store or retail establishment may claim the premium which has already been deducted from the price paid by the purchaser. This separate review can delay the speed of the checkout with the result that additional checkout personnel and scanners are necessary. Additionally, it is not unknown for the checkout personnel to permit the use of a premium coupon when, in fact, the related goods have not been purchased. Consequently, a new and unique UPC scannable coupon is necessary in order to overcome the above outlined problems.

It is known from Wilson, No. 3,211,470, to provide a UPC scannable coupon which is integral with the label or wrapper of the article to be purchased. The UPC scannable coupon of Wilson must be separated from the label without tearing the label so that the purchaser will be able to identify the goods purchased.

It is known from Schechter, No. 4,010,964, to provide a plurality of premium coupons which may have UPC scannable indicia thereon. The coupons of Schechter are not attachable to the product to be purchased and it is necessary for the checkout personnel to individually review each of the coupons of Schechter in order to ascertain that the related goods have been purchased.

It is known from Small, No. 1,239,977, to provide a two-piece coupon which has a first portion attachable to an article and a second interconnected removable portion which is in an overlying relationship with the first portion.

In view of the above, a new and unique UPC scannable coupon which is adapted for being attached by the ultimate consumer in a pre-oriented relationship so that the scannable indicia may be scanned while the dealer redemption report return portion may be separated therefrom and thus eliminating manual review is necessary. The present invention provides such a consumer attached pre-oriented scannable coupon which may be used in combination with an article to be purchased and an optical scanner system.

OBJECTS AND SUMMARY OF THE INVENTION

It is a primary object of the disclosed invention to provide a UPC scannable coupon which overcomes the above outlined problems.

It is an additional object of the disclosed invention to provide a consumer attachable pre-oriented scannable coupon which may be used in combination with an article to be purchased and an optical scanning system.

It is another object of the disclosed invention to provide a scannable coupon in which adhesive means are provided on a portion of the coupon to orient the coupon so that one portion of the coupon is firmly fixed to the article to be purchased and that the dealer redemption return portion may be separated therefrom.

An additional object of the disclosed invention is to provide a scannable coupon having a stub portion or article attached portion and a dealer redemption return portion and with scannable indicia being printed on the stub portion.

Still another object of the disclosed invention is to provide a scannable coupon which may be attached to the article to be purchased by the consumer and in which the optical scanning indicia is pre-oriented so as to be in a position to be scanned when the coupon is attached to the article.

Yet an additional object of the disclosed invention is to provide a plurality of scannable coupons which are interconnected in strip form.

Still a further object of the disclosed invention is to provide a scannable coupon with a stub portion and a dealer redemption return portion in which the stub portion includes optically scannable indicia and the amount of the premium to be paid and which remains with the article after the dealer redemption return portion has been separated by the checkout personnel.

Still a further object of the disclosed invention is to provide a plurality of scannable coupons in strip form which are readily manufactured from a single strip of paper or other suitable material.

Yet another object of the disclosed invention is to provide a scannable coupon which is attachable to the article to be purchased and which eliminates the need for the checkout personnel to review whether or not the relevant article has been purchased by providing data to a host computer system.

Still yet a further object of the disclosed invention is to provide force responsive separation means between the stub portion and the dealer redemption portion with adhesive means on the stub portion adjacent to the separation means so to make sure that the dealer redemption return portion may be readily and positively separated from the stub portion after the coupon has been scanned.

These and other objects and advantages of the invention will be readily apparent in view of the following description and drawings of the above described invention.

DESCRIPTION OF THE DRAWINGS

The above and other objects and advantages and novel features of the present invention will become apparent from the following detailed description of the preferred embodiment of the invention illustrated in the accompanying drawings, wherein:

FIG. 1 is a top plan view disclosing a strip of a plurality of interconnected premium coupons of the invention;

FIG. 2 is a fragmentary bottom plan view of the strip of FIG. 1;

FIG. 3 is a fragmentary bottom plan view of the strip of FIG. 1 and disclosing an additional embodiment of the adhesive means;

FIG. 4 is a perspective view of an article to be purchased with a premium coupon of the invention attached thereto; and, FIG. 5 is a perspective view similar to FIG. 4 and with a dealer redemption return portion partially separated from the attached stub portion.

DESCRIPTION OF THE INVENTION

A strip 10 comprised of a plurality of premium coupons C1, C2, C3 and C4 is best shown in FIG. 1. Strip 10 is preferably manufactured from a single strip of paper or other suitable material, of which many are well known in the art. A series of force responsive perforations or separation means 12, 14 and 16 are disposed between coupons C1 and C2, C2 and C3, and C4, respectively. Although perforations 12, 14 and 16 are disclosed, it should be obvious that any number of means for separating one coupon from another are well known in the art and the present invention is not limited to perforations.

Each premium coupon, of which coupon C1 is representative, has a top edge 18 and a bottom edge 20, both edges 18 and 20 being generally parallel to perforations 12, 14 and 16. Additionally, each premium coupon, of which coupon C1 is representative, has a pair of generally parallel side edges 22 and 24 which are generally transverse of top edge 18 and bottom edge 20.

Each premium coupon, of which premium coupon C1 is representative, includes a stub portion 26 and a dealer redemption return portion 28. A series of force responsive perforations or separation means 30 are disposed between stub portion 26 and dealer redemption return portion 28 and perforations 30 are generally parallel to side edges 22 and 24. Preferably, perforations 30 are positioned intermediate side edges 22 and 24, such that dealer redemption return portion 28 has a length substantially exceeding the length of stub portion 26 for facilitating separation of dealer redemption return portion 28 from stub portion 26, as will be explained herein later.

Each premium coupon, of which coupon C1 is representative, includes UPC optically scannable indicia means 32 which is printed or otherwise disposed on the front surface of stub portion 26 and which is positioned generally parallel to side edge 22 and spaced a slight distance therefrom to permit ease in printing. Additionally, stub portion 26 includes product information 34 which in the preferred mode indicates the amount of premium to be paid upon purchase of the article. Preferably, product information 34 is spaced from UPC indicia 32 and is also generally parallel to side edge 22 and perforations 30 to permit ease in printing.

Dealer redemption return portion 28 includes printed product information 36 which usually indicates the product for which the premium is to be paid and the amount of the premium as well as other necessary information. The dealer redemption return portion 28 ordinarily must be returned to the manufacturer by the grocery store so that the grocery store may receive the premium as the amount of the premium is ordinarily deducted from the price to the consumer of the product. Consequently, it is important that the dealer redemption return portion 28 be easily and readily separated from stub portion 26 so that dealer redemption return portion 28 may be returned to the manufacturer.

Strip 10 includes front surface 38 and a rear surface 40. As best shown in FIG. 2, a glue strip 42 runs longitudinally the length of rear panel 40 of strip 10 generally parallel to perforations 30 and a slight distance therefrom. Glue strip 42 is disposed on the rear surface 44 of stub portion 26. Preferably, glue strip or adhesive means 42 is of the remoist type, which is well known in the art, and which is activated or becomes very sticky upon being moistened. Preferably, the adhesive means or glue strip 42 is applied in one strip so that all of the coupons C1, C2, C3 and C4 have their respective adhesive means applied in a continuous aligned operation.

An additional embodiment of the adhesive means is disclosed in FIG. 3. Adhesive means 46, as best shown in FIG. 3, includes pressure sensitive adhesive 48 which is applied in a single continuous operation generally parallel to perforations 30 and spaced a slight distance therefrom and is of a type well known in the art. A release strip 50 detachably covers adhesive 48 and may be removed as desired by the consumer so to expose adhesive 48. It should be noted that perforations 12 also perforate release strip 50 for ease in separating the respective coupons C1, C2, C3 and C4. In this way, the consumer may select the appropriate coupon and remove release strip 50 so to expose adhesive 48 for attaching rear surface 44 of stub portion 26 to the article to be purchased. Because adhesive means 42, adhesive means 48 and release strip 50 are applied in continuous operations, the simplicity and ease of manufacturing strip 10 is increased.

OPERATION

Strip 10 including coupons C1, C2, C3 and C4 is uniquely adapted for being distributed through the mails, through advertising supplements, and by other distribution media well known in the premium coupon art. The purpose of the premium coupons is to arouse the interest of the ultimate recipient and to promote the sale of the relevant product by discounting the price of the product and therefore, hopefully, stimulating sales of the product. After the premium coupons C1, C2, C3 and C4 of strip 10 are received by the ultimate consumer, it is necessary that the consumer take the coupons to the grocery store or other retail establishment so to purchase the product and receive the premium.

After the consumer has selected the appropriate product or article to be purchased, such as that contained in container 52, as best shown in FIGS. 4 and 5, then a premium coupon such as coupon 54 must be securely fastened to container 52. Coupon 54 is identical in construction to coupons C1, C2, C3 and C4 and has a stub portion 56 and a dealer redemption return portion 58, both of which are as described above. Stub portion 56 has a rear surface which contains the adhesive means such as adhesive means 42, 48 and 50 for securely fastening the rear surface of stub portion 56 to container 52 so that the UPC scannable indicia 60 is oriented outwardly so to be scanned by an optical scanner (not shown) as is well known in the art. It should be noted that coupon 54 is secured to container 52 some distance from UPC scannable indicia 62 which is printed thereon by the manufacturer and which contains the product pricing information. After the UPC indicia 62 and the UPC indicia 60 of coupon 54 have been scanned, then the dealer redemption return portion 58 of coupon 54 is separated from the stub portion 56. In order to insure separation of the dealer redemption return portion 58 from stub portion 56, the checkout cashier (not shown) merely grasps dealer return portion 58 and pulls downwardly thereon with the result that the stub portion 56 remains secured to container 52 while the dealer redemption return portion 58 is easily separated therefrom so as to be returned to the manufacturer. The positioning of the adhesive 42 or 48 adjacent the tear line or perforations 30, rather than remote therefrom, permits the angle of tear to be greatest and thus prevents removal or stripping of the entire coupon strip 10 from the container 52 which would cause additional work to clerk to manually separate the coupon strip. An advantage not to be overlooked is that the stub portion contains the printed product information, preferably containing the amount of the premium, and remains affixed to the container 52 so that whenever the consumer observes container 52 the consumer will note that the product was purchased and a premium was paid thereon. Additionally, because dealer redemption return portion 58 is integral with stub portion 56 it is not necessary that the checkout personnel review the coupons and the products purchased because the coupon 54 is securely attached to the container 52 and, consequently, the checkout personnel can easily ascertain that the product for which the premium is being paid is the product which is actually being purchased. Preferably, the optical scanning system (not shown) will contain a computer program which will verify the UPC scannable indicia 60 with the UPC scannable indicia 62 to ascertain that the premium coupon 54 has been attached to the proper container 52. This eliminates the possibility that the checkout personnel will inadvertently fail to review the goods purchased and the premium coupons.

While this invention has been described as having a preferred design, it is understood that it is capable of further modifications, uses and/or adaptations of the invention following, in general, the principle of the invention and including such departures from the present disclosure as come within known or customary practice in the art to which the invention pertains, and as may be applied to the essential features here and before set forth, and fall within the scope of the invention to the limits of the appended claims.

What I claim is:

1. A consumer attachable pre-oriented scannable coupon for use in combination with an article and an optical scanning system, comprising:
   a. a generally planar member having front and rear surfaces;
   b. said member including a stub portion and a dealer redemption return portion;
   c. force responsive separation means disposed between said stub portion and said dealer redemption return portion;
   d. said stub portion rear surface having adhesive means generally adjacent said separation means for securing said stub portion to said article and for permitting ease in separation of said dealer redemption return portion from said stub portion when said stub portion is secured to an article;
   e. said stub portion front surface having optically scannable indicia means thereon for being scanned by said scanner system and for transmitting data thereto;
   f. said stub portion front surface having premium information printed thereon spaced from said optically scannable indicia means;
   g. said dealer redemption return portion front surface having printed information thereon; and,
   h. said dealer redemption return portion being separatable from said stub portion generally subsequent to said optically scannable indicia means being scanned by said scanner system and whereby said adhesive means secures said stub portion to said article while sufficient force is applied to said dealer redemption return portion for causing separation of said dealer redemption return portion from said stub portion.

2. A coupon as in claim 1, wherein:
   a. said member having a pair of generally parallel side edges, one of said side edges being associated with said dealer redemption return portion and the other one of said side edges being associated with said stub portion, and
   b. said force responsive separation means including a series of perforations being generally parallel to said pair of side edges.

3. A coupon as in claim 2, wherein:
   a. said adhesive means being generally parallel to said perforations.

4. A coupon as in claim 3, wherein:
   a. said adhesive means including water activated glue.

5. A coupon as in claim 3, wherein:
   a. said adhesive means including pressure sensitive glue means; and,
   b. a removable release strip associated with said pressure sensitive glue means and adapted for being removed therefrom for exposing said adhesive means.

6. A coupon as in claim 3, wherein:
   a. dealer redemption return portion having a length substantially exceeding said stub portion length.

7. A coupon as in claim 3, wherein:
   a. said optically scannable indicia means being generally parallel to said stub portion side edge and spaced therefrom.

8. A coupon as in claim 7, further comprising:
   a. said member having a top edge and a bottom edge; and,
   b. a plurality of said members being interconnected whereby a top edge of a first member is connected to a bottom edge of a second member.

9. A coupon as in claim 8, wherein:
   a. second force responsive separation means disposed between each of said plurality of members for ease of separation of said members.

10. A coupon as in claim 9, wherein:
    a. said second force responsive separation means including a series of perforations.

11. A coupon as in claim 9, wherein:
    a. said adhesive means of each of said members being aligned with said adhesive means of said other members.

12. A coupon as in claim 8, wherein:
    a. said plurality of members being integral with each other.

* * * * *